United States Patent [19]

Murakami et al.

[11] Patent Number: 5,032,036
[45] Date of Patent: Jul. 16, 1991

[54] JOINT STRUCTURE OF ANNULAR MEMBER AND SHAFT MEMBER

[75] Inventors: Yukitoshi Murakami; Hirofumi Dodoro, both of Kashiwara; Naoki Minamoto, Toyota; Atsushi Chiba, Toyoake; Minoru Kinbara, Toyota, all of Japan

[73] Assignees: Koyo Seiko Co., Ltd., Osaka; Aisin Seiki Kabushiki Kaisha, Kariya, both of Japan

[21] Appl. No.: 447,845

[22] Filed: Dec. 8, 1989

[30] Foreign Application Priority Data

Dec. 9, 1988 [JP] Japan .................. 63-160626[U]

[51] Int. Cl.$^5$ .............................................. F16B 11/00
[52] U.S. Cl. .................................. 403/282; 403/345
[58] Field of Search ............... 403/282, 280, 345, 285, 403/267, 273, 274, 359; 29/525

[56] References Cited

U.S. PATENT DOCUMENTS

| | | | |
|---|---|---|---|
| 3,306,223 | 2/1967 | Liebig . | |
| 3,717,368 | 2/1973 | Czarnecki et al. | 403/345 X |
| 3,872,578 | 3/1975 | Ullom | 403/282 X |
| 4,370,793 | 2/1983 | Kanamaru et al. | 403/274 X |
| 4,376,333 | 3/1983 | Kanamaru et al. . | |
| 4,525,098 | 6/1985 | Krude et al. | 403/280 |
| 4,874,259 | 10/1989 | Sato et al. . | |
| 4,886,392 | 12/1989 | Iio | 403/282 |

FOREIGN PATENT DOCUMENTS 409982 5/1934 United Kingdom .
1208872 10/1970 United Kingdom .

*Primary Examiner*—Peter M. Cuomo
*Attorney, Agent, or Firm*—Burns, Doane, Swecker & Mathis

[57] ABSTRACT

A joint structure of an annular member and a shaft member softer than the former is produced by
(a) providing a shaft member with an oil spreading over its circumference, the shaft member having a plurality of discrete grooves, on its circumference in an inclined angular configuration about the axis of the shaft member, and
(b) press fitting the annular member to the bore of the annular member with an interference such that the inner periphery of the annular member bore meshingly expands into the grooves. Press fitting proceeds under resilient deformation of the inner periphery of the annular member in the boundary friction state. A continuous oil film remains on the mating surfaces while securing firm joint.

11 Claims, 3 Drawing Sheets

JOINT STRUCTURE OF ANNULAR MEMBER AND SHAFT MEMBER

FIELD OF THE INVENTION

This invention relates to a joint structure of an annular member and a shaft member in which the annular member is press fitted on the shaft member. Particularly, the present invention relates to an improved joint structure of an annular member and a shaft member which is obtainable by tight fitting the annular member with its bore onto the shaft member with an oil such as a rust-preventing oil remaining thereon whereby the two members are securely jointed to each other while ensuring smooth press fitting.

BACKGROUND

In joining an annular member and a shaft member (axle) to each other, it has been customary to press fit one end of the shaft member into a bore of the annular member so as to produce a press fit, that is a fit with an interference of a negative gap, so as to be secured to each other in axial and rotational directions. However, with such press fit when performed under dry frictional conditions, it is extremely difficult or occasionally impossible to perform the press fit through scoring of the mating surfaces. If the shaft member is forced into the annular member, the alignment of the annular member about the axis is deteriorated (tolerance enlarged).

There is also known a manner of providing smooth press fit free of scoring by directly utilizing an oil, such as rust-preventing oil, applied to the surface of the shaft member, at the time of press fitting. However, with this manner, it may occur that an excess amount of oil remains as an oil film on the overall mating surfaces to weaken the jointing force between the annular member and the shaft member to cause idle rotation or axial shifting (generally slide) of the annular member relative to the shaft member.

As hereinabove mentioned, there is discrepancy in the prior art. Namely, with the technique for an enhanced jointing force, it becomes difficult to perform the press fitting operation, while the misalignment of the annular member about its axis is enlarged. On the other hand, with the manner for improving the precision in axial alignment, the jointing force is lowered.

Along this line, the JP U.M. KOKAI Publication 63-115926 (1988) discloses an artifice in which a recess is provided on at least one of the outer circumferential surface of the shaft member or the inner peripheral surface of a bore of the annular member, an oil film of the rust-preventing oil remaining on the mating surfaces (more precisely, mating clearance) are interrupted (or blocked) and scraped off by the edge of the recess upon press fitting the shaft member, and the scraped rust-preventing oil is stored within the recess.

SUMMARY OF THE DISCLOSURE

With this artifice, the oil film is scraped off and thus depleted on the rearward region of the recess so that the press fit proceeds under the dry-frictional state in this region which is subjected to scoring, which, as a result, offers an extreme difficulty in the press fitting or even makes it impossible.

It is a principal object of the present invention to provide a joint structure of an annular member and a shaft member in which the scoring can be prevented on the mating surfaces upon press fitting for facilitating the press fit operation while securely jointing the shaft member and the annular member.

For accomplishing the above object, the present invention according to the first aspect provides:

a joint structure of an annular member and a shaft member jointed together by press fitting a shaft member with an oil remaining on its surface into a bore of an annular member, wherein the improvement comprises:

that the annular member has a lower hardness than the shaft member, that a plurality of grooves, which are substantially parallel and circumferentially discontinuous, are formed on the circumference of the shaft member in an inclined angular configuration about the axis of the shaft member, that the annular member with its inner bore periphery meshingly protrudes into said discontinuous grooves as a result of expansion due to interference upon press fitting, and that an oil film which prevents scoring during the press fitting is retained on the mating surface between the annular member and the shaft member.

According to the second aspect of the present invention, there is provided a process for producing a press fitted joint structure of an annular member and a shaft member, comprising:

(a) providing a shaft member with an oil spreading over its circumference, the shaft member having a plurality of discrete grooves, which are substantially parallel, on its circumference in an inclined angular configuration about the axis of the shaft member, (b) providing an annular member having a bore with an interference for press fitting onto the shaft member, and having a hardness lower than the shaft member, and (c) press fitting the annular member to the bore of the annular member such that the inner periphery of the annular member bore meshingly expands into the grooves.

According to the present invention, press fitting of the shaft member into the annular member proceeds under the resilient deformation of the inner periphery of the annular member, formed of a softer material compared to the shaft member, owing to the discrete grooves on the shaft member, with the material (portion to be resiliently deformed) of the annular member intruding and biting in the grooves of the shaft member.

During the press-fitting procedure, a small amount of oil is scraped off by the edges of the grooves formed on the shaft member, however, since the smooth surface is present between the adjoining grooves, a continuous oil film is left over on the overall mating surfaces, so that press fitting proceeds smoothly under the condition of boundary friction.

Although the oil film is left over on the mating surfaces, the resistance against movement between the shaft member and the annular member both in the axial and rotational directions is increased due to the annular member biting into the grooves.

The discontinuous and discrete arrangement of the grooves assures the retainment of the thin oil film in a sufficient amount such that can prevent the scoring, i.e., establish boundary friction. (Here, the term "boundary friction" is defined that two clean surfaces of the solid bodies are in the friction interposed with an absorbed layer of liquid molecules.) The groove are formed at least partly within the mating surface of the two members. By the inventive provision, rust-preventing oil is efficiently employed as the oil for preventing the scoring which is very advantageous in that is unnecessitates additional use of a different oil other than the rust-preventing oil which is customary used. Preferably, the grooves extend over a length of ¼ to ⅓ of the entire axial length of the mating surface of the shaft member. The inclined angle is more than zero and less than 90 degrees relative to the shaft member axis, and defined appropriately depending on the various requirements for the joint structure. The inclined angle is preferably 30-60 degrees, more preferably about a half of the right angles to the shaft member axis.

It is preferred that the grooves have a width of 0.1 to 0.4 mm and a depth roughly of 0.05 to 0.2 mm. However such groove dimensions are subject to change according to the sizes and materials of the shaft member and the annular member.

In summary, it will be appreciated from the foregoing and the subsequent detailed description that the present invention provides an arrangement in which the oil coated on the outer periphery of the shaft member may be maintained substantially in the overall press-fit region and hence the press fit may proceed under the conditions of boundary friction, so that smooth and scoring-free press fit may be achieved. Moreover, the resistance of the shaft member and the annular member in both the axial and rotational directions is enhanced by the biting of the annular member into the grooves formed on the shaft member, so that the adverse effects of the residual oil film on the mating surfaces may be minimized and hence the two members may be jointed very firmly to each other. Thus the joint structure of the annular member and shaft member may be provided whereby not only the precision in press fitting, i.e., an improved axial alignment is assured but the both members can be jointed steadily in both the axial and rotational directions.

BRIEF DESCRIPTION OF THE DRAWINGS

FIGS. 1 to 4 illustrates an embodiment of the present invention, wherein FIG. 1 is a longitudinal cross-sectional view showing a water pump of an automotive engine to which the present invention is applied.

FIG. 2 is a longitudinal cross-sectional view showing only the bearing unit of FIG. 1, in an enlarged scale.

FIG. 3 is a cross-sectional view taken along the line III—III in FIG. 1.

FIG. 4 is an enlarged schematic view showing the grooves and the biting portions in FIG. 3.

DESCRIPTION OF THE PREFERRED EMBODIMENT

Figure 1:
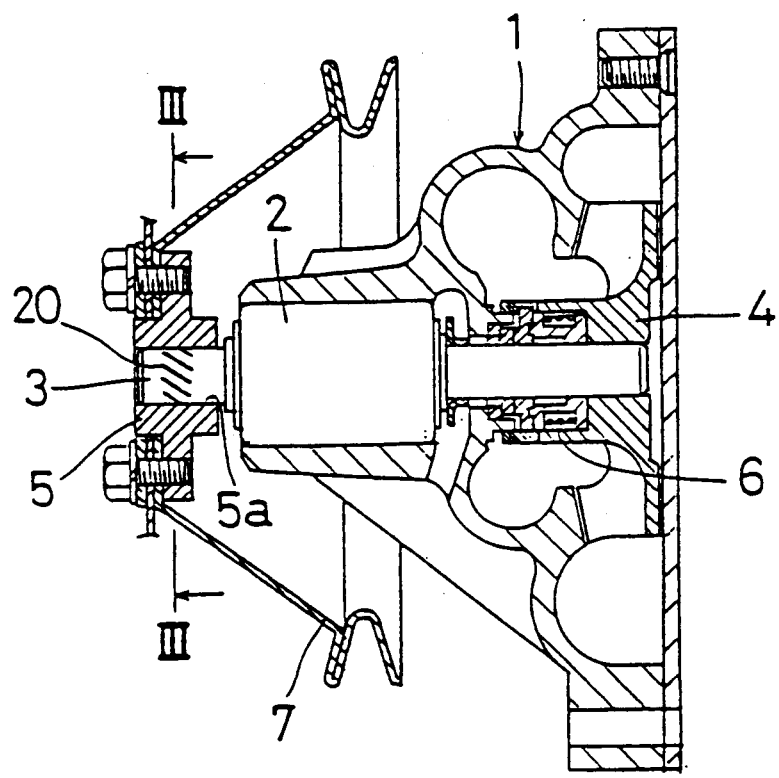

By referring to the drawings, a preferred embodiment of the present invention will be explained in detail. In FIGS. 1 through 4, illustrating the preferred embodiment of the present invention, FIG. 1 shows a water pump in an automotive engine to which the present invention is applied.

In the water pump, shown in FIG. 1, a pump housing 1 is mounted to an engine block, not shown. An outer ring of a bearing unit 2 is fitted into a bore of the pump housing 1. A pump shaft 3, used as an inner ring of the bearing unit, is supported by this bearing unit 2. A pump rotor 4 and a pulley seat 5 are secured by press fit to one (in FIG. 1, right-hand side) end and to the other (left-hand side) end respectively, of the pump shaft 3. A mechanical seal 6 is interposed between the pump rotor 4 and the pump shaft 3, and a driving pulley 7 for a cooling fan, not shown, is mounted to the pulley seat 5.

Figure 2:
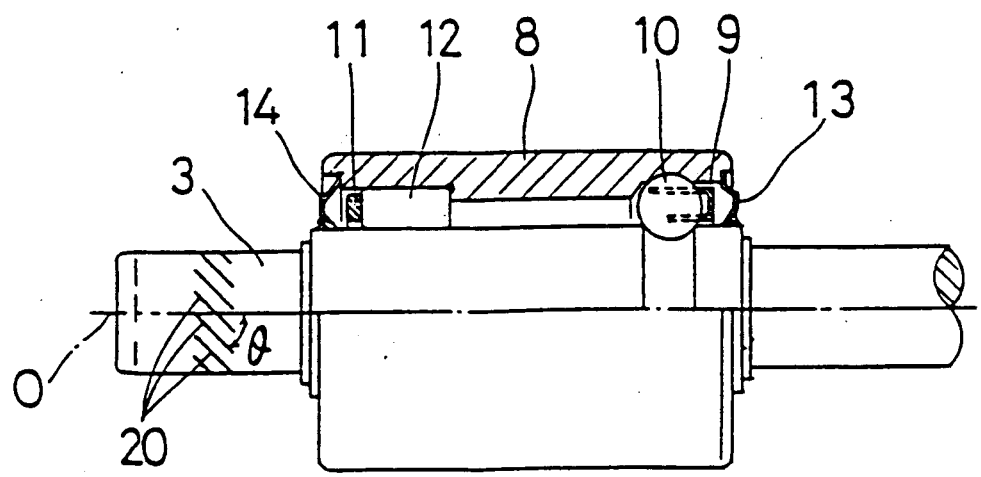

Referring to FIG. 2 the bearing unit 2 is comprised of a tubular outer ring 8, a plurality of balls 10 disposed between the one end of the outer ring 8 and the pump shaft 3 and retained by a retainer 9 at equiangular intervals on the circumference of the bearing unit, a plurality of cylindrical rollers 12 disposed between the other end of the outer ring 8 and the pump shaft 3 and retained by a retainer 11 at equiangular intervals on the circumference of the bearing unit and seals 13, 14 attached to both ends of the outer ring 8 and tightly sealing the inside of the bearing.

In the above described water pump, the pump shaft 3, referred to as the shaft member in the claims, is formed of bearing steel, such as SUJ 2, whereas the pulley seat 5, referred to as the annular member in the claims, is formed of structural steel softer than the pump shaft material, such as S25C. The pulley sheet 5 has a bore 5a which is smaller in diameter by, for example, in the order of micrometers (preferably 50 to 70 micrometers), as compared with the diameter of the pump shaft 3, to provide a proper press-fit interference. The pump shaft 3 may be hardened to the core, or hardened only at the surface by carburizing treatment in a known manner.

Figure 6:
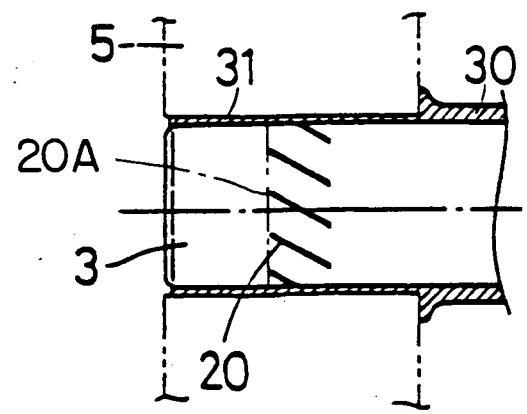
FIG. 6 is a schematic view showing the state of the oil film upon completion of press-fitting of the pulley sheet.

At the other end region of the pump shaft 3, there are formed a plurality of mutually parallel grooves 20. The grooves are generally of a V shape in cross-section and discontinuous with respect to the circumferential direction while being inclined at an angle with respect to an axis O of the pump shaft 3. More specifically, the angle $\theta$ of these grooves is set such that $0° < \theta < 90°$ with the groove being inclined downwards towards right in FIG. 2. As depicted in FIG. 6, the ends of the grooves which are directed toward the end of the shaft 3 terminate on a common circular line 20A which extends around the shaft circumference.

Figure 3:
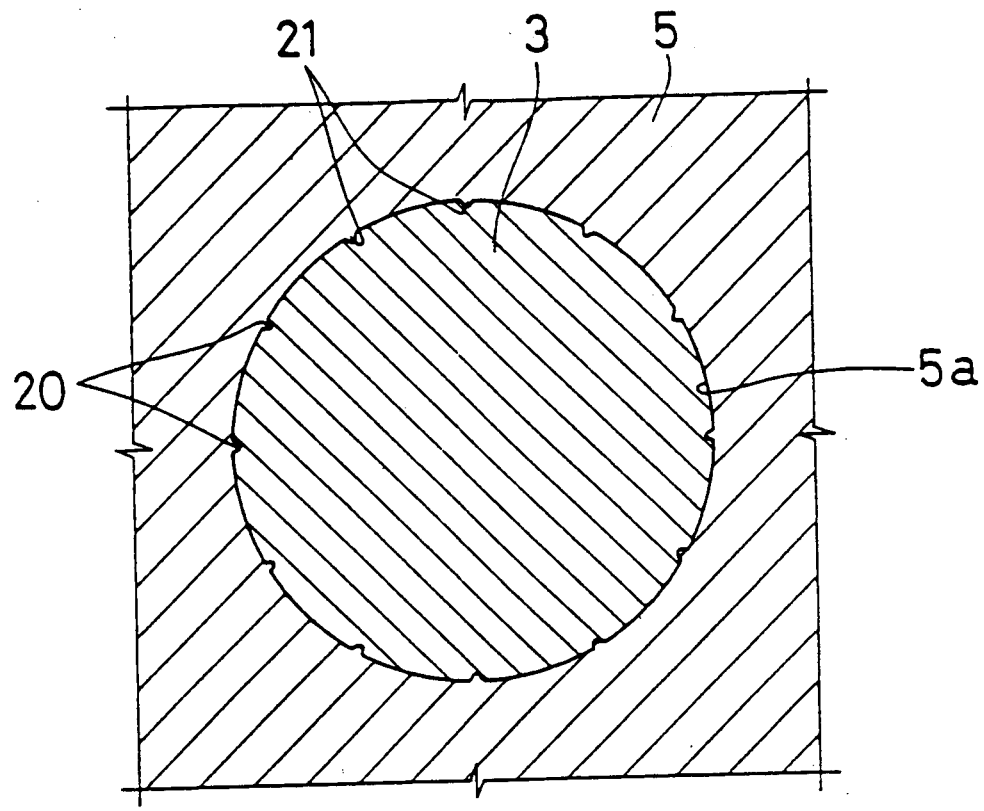
Figure 4:
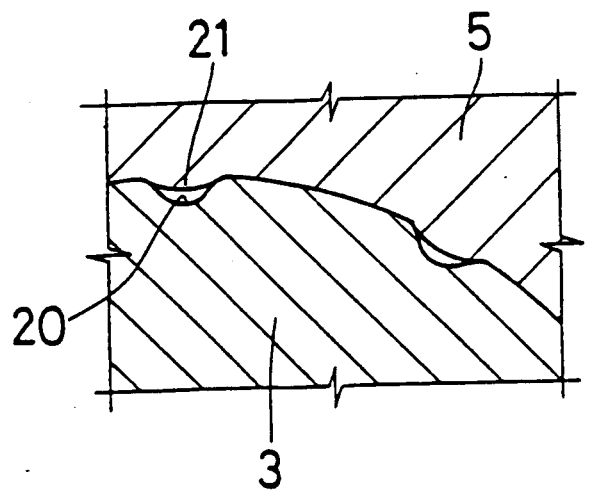

These grooves 20 are formed at an axially central portion of the pulley seat 5. (The pulley seat corresponds to the mating surface.) As shown in FIG. 3 and 4, the inner periphery of the pulley seat 5 is partially expanded (or bulged) to form a biting protrusion 21 in an amount corresponding to the press-fit interference so that it bites into the grooves 20. Meanwhile, these grooves 20 may be provided at an end portion, instead of at the central portion, of the pulley seat 5. Note, however, this expansion (or bulging) is only on appearance since the mating surfaces is resiliently expanded and the protrusion retains towards the original diameter (or radially expand in a relatively lesser extent than the mating surface).

The operation of attaching the pulley seat 5 to the pump shaft 5 will be hereinafter explained.

Figure 5:
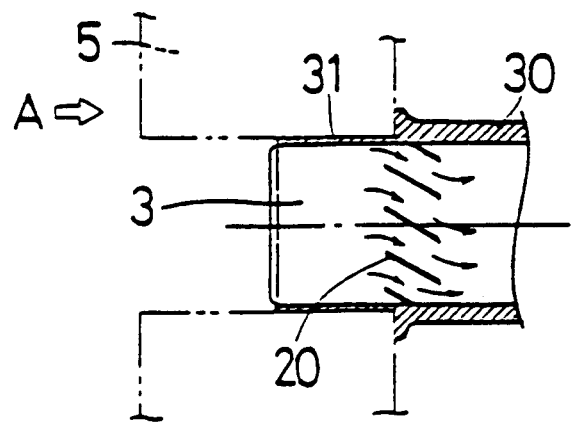
FIG. 5 is a schematic view showing the state of oil flow at a completed state of press-fitting of a pulley seat.

A suitable rust-preventing oil 30, having undermentioned properties, such as RL55, with a viscosity of 2.6 cSt/40° C., is applied to the outer peripheral surface of the pump shaft 3. With the end of the pump shaft 3 applied to the one end of the bore 5a of the pulley seat 5, the seat 5 is abutted in a coaxial configuration to the bore 5a and pressed along the direction shown by an arrow A in FIG. 5. Although the rust-preventing oil 30 is partially scraped off with the progress of the thrusting, the oil 30 flows on the smooth surface between the discrete adjoining grooves, as shown by the arrows, so that a continuous oil film 31 is retained over on the overall smooth surface between the grooves 20 and at the front and rear regions of the grooves. Thus the press fitting proceeds under the conditions of boundary friction. As the press fit of the pulley seat 5 is terminated, as shown in FIG. 6, the oil film 31 is retained on the mating surfaces (clearance) without being interrupted at the grooves 20. On the other hand, the inner periphery of the bore of the pulley seat 5 is deformed and expanded elastically to bite into the grooves 20 provided on the pump shaft 3.

Since the oil film is left over on the overall pressfit surface of the pump shaft 3, a smooth scoring-free press fit may be guaranteed. While there may be certain fear that the jointing force may be weakened by the oil film remaining on the mating surfaces, since the pulley seat 5 bites into the grooves 5 formed in the pump shaft 3 with a suitable angle, the effects of the residual oil film 31 are reduced, so that the resistance in the rotational and axial directions is increased and hence the two members are jointed and secured firmly to each other.

The grooves may be formed in a suitable member, preferably at an equiangular interval, for instance 9 to 23 lines, e.g., for a shaft member having a diameter of 12 to 25.4 mm. But the grooves are configured depending on different requirements, materials and dimensions of the two members.

Although the present invention has been described with reference to a water pump, it should be noted that the present invention may also be applied to various other devices or equipments than the water pump.

It should be noted that modifications in the art may be made without departing from the gist and concept of the present invention herein disclosed and within the scope of the claims herein annexed.

What is claimed is:

1. A joint structure of an annular member and a shaft member joined together by press fitting a shaft member with an oil on its surface into a bore of an annular member, wherein the improvement comprises:

the annular member having a lower hardness than the shaft member, a plurality of grooves, which are substantially parallel and circumferentially discontinuous, are formed on the circumference of the shaft member in an inclined angular configuration about the axis of the shaft member, the grooves having ends directed toward a shaft member end and terminating substantially on a common circular line extending around the circumference of the shaft member, the annular member with its inner bore periphery meshingly protrudes into said discontinuous grooves as a result of expansion due to interference upon press fitting, and an oil film which prevents scoring during the press fitting is retained on the mating surfaces between the annular member and the shaft member by boundary friction.

2. The joint structure as defined in claim 1, in which the grooves extend at least a part of the axial length of the mating surface.

3. The joint structure as defined in claim 2, in which the grooves extend only within the axial length of the mating surface.

4. The joint structure as defined in claim 2, in which the grooves extend over a length of ¼ to ½ of the extire axial length of the mating surface.

5. The joint structure as defined in claim 1, in which the inclined angle is about a half of 90 degrees.

6. The joint structure as defined in claim 1, in which the grooves has a width of 0.1 to 0.4 mm.

7. The joint structure as defined in claim 1, in which the grooves has a depth of 0.05 to 0.2 mm.

8. The joint structure as defined in claim 1, in which said oil is rust-preventing oil.

9. The process as defined in claim 8, in which the grooves are formed at least partly within the mating surface of the two members.

10. A process for producing a press fitted joint structure of an annular member and a shaft member, comprising:

(a) providing a shaft member with an oil film over its circumference, the shaft member having a plurality of discrete grooves, which are substantially parallel, on its circumference in an inclined angular configuration about the axis of the shaft member, the grooves having ends directed toward a shaft member end and terminating substantially on a common circular line extending around the circumference of the shaft member, (b) providing an annular member having a bore with an interference for press fitting onto the shaft member, and having a hardness lower than the shaft member, and (c) press fitting the annular member to the bore of the annular member such that the inner periphery of the annular member bore meshingly expands into the grooves.

11. The process as defined in claim 10, in which the oil is rust-preventing oil.

* * * * *